United States Patent
Dagnew et al.

(10) Patent No.: US 12,103,877 B2
(45) Date of Patent: Oct. 1, 2024

(54) PROCESS FOR MANAGING WORMS IN MEMBRANE AERATED BIOFILM

(71) Applicant: BL TECHNOLOGIES, INC., Minnetonka, MN (US)

(72) Inventors: Martha Dagnew, Oakville (CA); Kyle Waldner, Burlington (CA)

(73) Assignee: BL TECHNOLOGIES, INC., Minnetonka, MN (US)

( * ) Notice: Subject to any disclaimer, the term of this patent is extended or adjusted under 35 U.S.C. 154(b) by 0 days.

(21) Appl. No.: 16/613,720

(22) PCT Filed: May 15, 2017

(86) PCT No.: PCT/US2017/032681
§ 371 (c)(1),
(2) Date: Nov. 14, 2019

(87) PCT Pub. No.: WO2018/212751
PCT Pub. Date: Nov. 22, 2018

(65) Prior Publication Data
US 2020/0071213 A1    Mar. 5, 2020

(51) Int. Cl.
*C02F 3/20* (2023.01)
*C02F 3/00* (2023.01)
*C02F 3/12* (2023.01)

(52) U.S. Cl.
CPC .............. *C02F 3/208* (2013.01); *C02F 3/006* (2013.01); *C02F 3/1273* (2013.01); *C02F 2209/225* (2013.01); *C02F 2303/14* (2013.01)

(58) Field of Classification Search
CPC .... C02F 3/208; C02F 3/1273; C02F 2303/14; C02F 3/201; C02F 3/006; C02F 2209/225; C02F 2209/22; Y02W 10/10
See application file for complete search history.

(56) References Cited

U.S. PATENT DOCUMENTS 7,854,843 B2 *  12/2010  Pehrson .................... C02F 3/06
                                                         210/605
2004/0211723 A1  10/2004  Husain et al.
(Continued)

FOREIGN PATENT DOCUMENTS

| WO | 2005039291 A2 | 5/2005 |
| WO | 2006058097 A1 | 6/2006 |
| WO | 2015142586 A2 | 9/2015 |

OTHER PUBLICATIONS

International Application No. PCT/US2017/032681, International Search Report and Written Opinion dated Jul. 3, 2017.
(Continued)

*Primary Examiner* — Ekandra S. Miller-Cruz

(57) ABSTRACT

An overgrowth of worms can reduce the effluent quality of a membrane aerated biofilm reactor. A method of controlling the growth of worms in a membrane aerated biofilm includes discontinuing all oxygen sources to a tank containing the biofilm and fluid flows flow into the tank. The tank is maintained in this idle condition for a period of time sufficient to kill at least some of the worms living in the biofilm. The method may be applied periodically to inhibit the formation of an excessive population of worms or retroactively to reduce an already excessive population of worms.

8 Claims, 1 Drawing Sheet

(56) References Cited

U.S. PATENT DOCUMENTS

2006/0096918 A1\* 5/2006 Semmens ............ B01D 63/026
  210/615
2013/0193068 A1 8/2013 Jones et al.
2016/0009578 A1 1/2016 Cote et al.

OTHER PUBLICATIONS

International Application No. PCT/US2017/032681, International Preliminary Report on Patentability dated Nov. 28, 2019.
Australian Patent Application No. 2017414684, Examination Report dated Mar. 23, 2023.
Chinese Patent Application No. 201780090810.2, Decision of Rejection dated Dec. 27, 2022.
Chinese Patent Application No. 201780090810.2, First Office Action dated Oct. 8, 2021.
Chinese Patent Application No. 201780090810.2, Second Office Action dated Apr. 21, 2022.
Chinese Patent Application No. 201780090810.2, Third Office Action dated Aug. 24, 2022.
European Patent Application No. 17725486.9, Office Action dated Jan. 19, 2021.
Philippines Patent Application No. 1/2019/502552, Substantive Examination Report dated Mar. 22, 2021.
Korean Patent Application No. 10-2019-7037049, Request for the Submission of an Opinion, Nov. 22, 2021.
Korean Patent Application No. 10-2019-7037049, Notice of Final Rejection, May 12, 2022.
Korean Patent Application No. 10-2019-7037049, Notice of Final Rejection, Oct. 4, 2022.
Longyuan, et al., "English-Chinese/Chinese-English Vocabulary of Environmental Assessment," Sichuan Science and Technology Press, 2014, pp. 163.
Shen, et al., "Theory and Application of New Technology of Wastewater Biological Treatment, 2nd Edition," China Environmental Science Press, 2006, pp. 336-338.
Korean Patent Application No. 10-2023-7007314, Office Action dated Nov. 8, 2023.
Philippines Patent Application No. 1/2019/502552, Office Action dated May 27, 2024.
U.S. Appl. No. 18/495,373, Office Action dated May 22, 2024.

\* cited by examiner

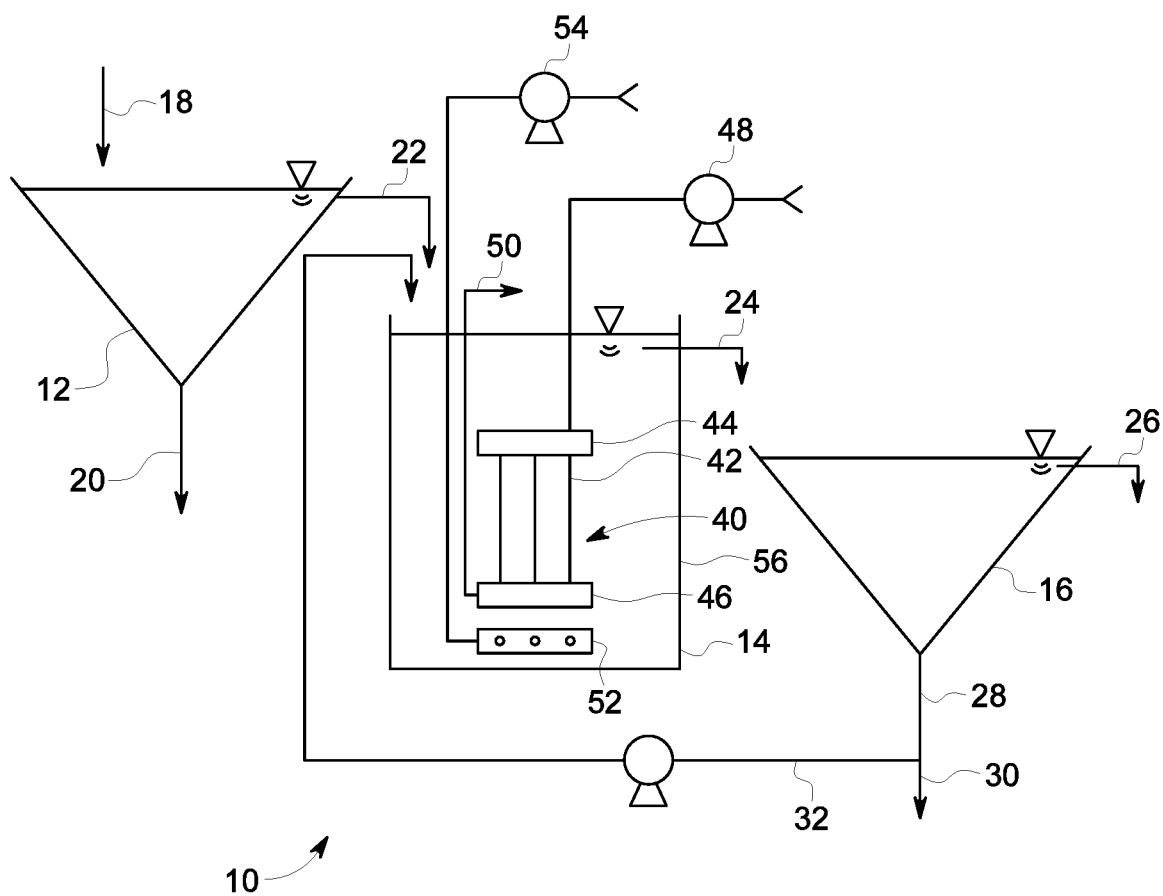

PROCESS FOR MANAGING WORMS IN MEMBRANE AERATED BIOFILM

CROSS-REFERENCE TO RELATED APPLICATIONS

This application is a National Stage Entry of International Application No. PCT/US2017/032681, filed May 15, 2017.

FIELD

This specification relates to wastewater treatment and membrane aerated biofilm reactors.

BACKGROUND

US Publication 20040211723, Membrane Supported Bioreactor for Municipal and Industrial Wastewater Treatment, describes a membrane supported biofilm reactor with modules having non-porous but oxygen permeable hollow fibers formed into fabric sheets. The sheets are potted into a module to enable oxygen-containing gas to be supplied to the lumens of the hollow fibers. A biofilm grows on the sheets and is used to treat wastewater. The thickness of the biofilm is controlled, among other methods, by the use of a higher life form such as worms in an isolated section of the reactor to digest excess biofilm periodically. The worms are grown in a separate bioreactor.

International Publication Number WO 2005/039291, Methods, Compositions and Devices for Inducing Stasis in Cells, describes the use of oxygen antagonists to induce stasis in cells. In one example, it was noted that the nematode *C. Elegans* dies in oxygen concentrations between 100 ppm and 1000 ppm, possibly between 10 ppm and 5000 ppm.

US Publication 20060096918, Biofilm Wastewater Treatment Devices, describes biofilters including a network of hollow fiber membranes. A biofilm develops on the membranes. Gas is provided to the biofilm through the membranes. In addition to bacteria, the biofilm can include protozoan and metazoan organisms such as invertebrates (e.g. nematodes), flagellates, and ciliates if conditions permit. The protozoans may effect the bacterial populations or create openings or paths for water to flow through the biofilm. The availability of oxygen deep within the biofilm can support the growth of higher organisms such as protozoans, rotifers and nematodes. In one example, stalked ciliates, free-swimming protozoans, rotifers and worms were observed in a biofilm.

US Publication 20130193068, Modification of Existing Wastewater Systems with Substrate Supported Biofilms, describes a wastewater treatment system with a basin including one or more substrates positioned in fixed locations. Bacteria couple to the substrates and form a biofilm. The biofilm is aerobic and may also include protozoa. The protozoa consume free bacteria and colloidal particulates and thereby aid in effluent clarification. Protozoa require a longer solids retention time than aerobic heterotrophic bacteria, prefer dissolved oxygen concentrations above 1.0 mg/L, and are sensitive to toxic materials.

INTRODUCTION

The effect of protozoans on membrane aerated biofilms is not well understood. Although they may have some beneficial effects, the inventors have observed that worms such as nematodes can to grow in abundance in membrane aerated biofilms. Large populations of worms appear to be detrimental to the nitrifying biomass and result in poor effluent quality.

This specification describes a method to control the growth of worms, for example nematodes, in a membrane aerated biofilm. In the method, supplies of oxygen to the biofilm, including oxygen dissolved in incoming water, are removed for a period of time effective to kill at least some of the worms living in the biofilm. In the example of a membrane aerated biofilm in a tank, all oxygen sources to the tank are shut off. These sources of oxygen can include air supplied through the membranes and air used for mixing the tank or agitating the membranes. Fluid flow into the tank is optionally shut off. The tank is maintained in this idle condition for a period of time, for example at least 3 hours or at least 6 hours. The method may be applied proactively to prevent an excessive population of worms from forming or retroactively to reduce an already excessive population of worms.

BRIEF DESCRIPTION OF THE FIGURES

FIG. 1 is a schematic process flow diagram of a wastewater treatment system with a membrane aerated biofilm reactor.

DETAILED DESCRIPTION

FIG. 1 shows a wastewater treatment system 10. The wastewater treatment system 10 includes a primary clarifier 12, a membrane aerated biofilm reactor (MABR) 14 and a secondary clarifier 16. Influent wastewater 18 enters the primary clarifier 12 and is separated into primary sludge 20 and primary effluent 22. The primary effluent enters the membrane aerated biofilm reactor 14 and is converted into mixed liquor 24. Mixed liquor 24 enters the secondary clarifier and is converted into effluent 26 and activated sludge 28. Activated sludge 28 is divided into waste activated sludge (WAS) 30 and return activated sludge (RAS) 32. The wastewater treatment system 10 operates as a hybrid of an activated sludge process and a membrane aerated biofilm process. Other types of wastewater treatment systems and process including a membrane aerated biofilm may also be used.

The MABR 14 includes a membrane module 40 having membranes 42 suspended between first header 44 and second header 46. Air is supplied to the module 40 from a first blower 48. The air flows into the first header 44 and is divided in the first header 44 into multiple streams of air that flow through the membranes 42. After passing through the membranes 46, oxygen-depleted air is exhausted from the second header 46 through exhaust line 50. The membranes 42 may have solid (dense) walls or pores too small to permit the bulk flow of water through them. Oxygen in the air passes through the membranes 42 and is supplied to biofilms growing on the membranes 42. A suitable membrane module is described in US Publication 2016/0009578 A1 or International Publication Number WO 2015/142586, which are incorporated herein. Suitable modules are also available commercially from GE Water & Process Technologies, sold under the trademark ZEELUNG.

The MABR 14 also has an aerator 52, alternatively called a sparger. Air is supplied to the aerator 52 from a second blower 54. Optionally, the aerator 52 may receive air instead, or in addition, from first blower 48 or exhaust line 50. The aerator 52 provides bubbles periodically to shake excess biofilm from the membranes 42. The aerator 52, or another aerator, may also stir the water in tank 56 of the MABR 14. The aerator 52, or another aerator, may also add dissolved oxygen to water in the tank 56. The water in tank 56 outside of the biofilm may be maintained under anaerobic, anoxic or aerobic conditions. However, in the example of the hybrid system shown in FIG. 1, the water in the tank 56 outside of the biofilm is typically maintained under anoxic or aerobic conditions.

Worms such as nematodes may grow in the biofilm. If the population of worms becomes too large, the biofilm will be less effective at nitrifying the water in the tank. Nitrification is required for the removal of total nitrogen from the influent wastewater by way of the nitrification-denitrification process. Without intending to be limited by theory, the inventors believe that worms such as nematodes burrow into the biofilm and eat nitrifying bacteria. Alternatively, if the direct consumption of nitrifying bacteria is not the cause of reduced effluent quality it may be that the tunnels left by worms allow oxygen to dissolve into the water in the tank 56 outside of the biofilm rather than in the biofilm. Regardless of the exact mechanism, total nitrogen concentration in effluent 26 can increase if the population of worms becomes too large.

In a first process, the population of worms is inhibited proactively to help prevent a decline in effluent quality from happening. Periodically, for example up to once per week, or at least once every other week, all flows of gas containing oxygen to the MABR 14 are discontinued. In the example of FIG. 1, this includes discontinuing the supply of air to the module 40 from the first blower 48 and the supply of air to the aerator 52 from the second blower 54. While the oxygen sources are discontinued, water flows into the tank 56 are optionally discontinued. In the example of FIG. 1, the flow of primary effluent 22 and RAS 32 are stopped. The flow of mixed liquor 44 is optionally stopped to avoid draining the tank 56. The MABR 14 remains in this idle state (with no incoming flows of water or gas) for a period of time. The period of time may be at least 3 hours, between 3 and 6 hours or at least 6 hours. The dissolved oxygen concentration in the tank 56 (measured in the water outside of the biofilm) declines while the MABR 14 is idled during the period of time to at or near zero, or at least to a level sufficient to kill at least some of the worms. When the period of time is over, flows of gas containing oxygen and water to the tank 56 are returned. The MABR 14 is brought out of its idle state and returned to operating conditions.

In a second process, the population of worms is reduced reactively. The second process is used in the event that an infestation of worms such as nematodes is noticed. As in the first process, all flows of gas containing oxygen to the MABR 14 are discontinued. In the example of FIG. 1, this includes discontinuing the supply of air to the module 40 from the first blower 48 and the supply of air to the aerator 52 from the second blower 54. While the oxygen sources are discontinued, water flows into the tank 56 are optionally discontinued. In the example of FIG. 1, the flow of primary effluent 22 and RAS 32 are stopped. The flow of mixed liquor 44 is also stopped to avoid draining the tank 56. The MABR 14 remains in this idle state (with no incoming flows of water or gas) for a longer period of time relative to the first process. The period of time may be at least 24 hours, for example between 24 and 48 hours, or for at least 48 hours. The dissolved oxygen concentration in the tank 56 (measured in the water outside of the biofilm) declines while the MABR 14 is idled to at or near zero, or at least to a level sufficient to kill at least some of the worms. The extended duration of the idle periods results in a larger percentage of the worms being killed relative to the first process. When the period of time is over, flows of gas containing oxygen and water to the tank 56 are returned. The MABR 14 is brought out of its idle state and returned to operating conditions. Due to the extended idle period, additional restart procedures may be required. For example, chlorine, or another chemical agent, may be added in the RAS 32 line to help kill the worms.

In a pilot study a 64-module membrane cassette was located in a tank filled to a volume of 16 m$^3$. The cassette contained a mixture of ZEELUNG membrane aerated biofilm modules and ZEEWEED membrane filtration modules. The biofilm attached to the membrane aerated biofilm modules provides nitrification. Suspended biomass in the bulk liquid provides denitrification by the bulk liquid (suspended biomass). The membrane filtration module replaces a clarifier downstream that may alternately be used for solid-liquid separation and maintaining a concentration of suspended solids in the reactor to produce a hybrid reactor. The membrane tank was maintained under anoxic condition. Details of ZeeWeed and ZeeLung operating conditions are summarized in Table 2.

Table 1 presents a summary of the process conditions. The pilot was seeded with MBR sludge and then used to treat municipal wastewater. The pilot was operated at an average 7.5 hours HRT and 4-7.5 days SRT. The SRTs varied to maintain mixed liquor suspended (MLSS) concentrations of 2-3 g/L. The pilot is designed to partially nitrify and denitrify. Nitrification is targeted to be performed by the biofilm. The bulk liquid served three purposes: (i) to simulate hybrid MABR conditions, (ii) convert nitrate to nitrogen, and (iii) to consume carbon by suspended bacteria thereby minimizing the growth of heterotrophic biofilm on the membrane. Mixing was provided by the coarse bubble aerators, which also scour the membrane aerated biofilm.

TABLE 1

| Parameter | ZEELUNG | ZEEWEED | Units |
|---|---|---|---|
| Number of modules | 12 | 24 | # |
| Membrane surface area/module | 40 | 33 | m$^2$ |
| Inlet process air flow/module | 75 (for 12 modules) | NA | Scfh |
| Outlet air pressure | 10 | NA | Psi |
| Instantaneous Flux | NA | 5 | LMH |
| Permeate production/relaxation | NA | 8/2 | min/min |
| Coarse bubble aerator | | | |
| Mixing intensity | 47 | | scfm |
| Mixing duration, on/off | 10/50 | | sec/sec |
| Scouring intensity | 94 & 141 (2 and 3x mixing) | | scfm |
| Scouring frequency | Twice per day | | |
| Average HRT | 7.5 | | Hrs |
| SRT | 4.5-7 | | Days |
| Operating volume | 16 | | m$^3$ |

Overall the pilot showed acceptable performance. However, a red worm bloom event was observed two weeks after installation of the coarse bubble aerators. It was determined that the worms were obligate aerobes. All sources of aeration were turned off and the cassette was inspected twice per day over 48 hours. After 48 hours of extended relaxation time, it was observed that most of the worms were dead. Subsequently normal operation was resumed. On a second inspection conducted about two weeks later, there were some signs of worm growth but the membrane aerated biofilm modules were still less wormy that during the bloom event. It was estimated that periodically ceasing aeration, for example for 6 hours every two weeks, could be sufficient to prevent further blooms in this example.

We claim:

1. A method for controlling the population of worms in a membrane aerated biofilm in a tank, the method comprising supplying oxygen to the biofilm through a supporting membrane; supplying air periodically to agitate the supporting membrane wherein the air supplied to agitate the supporting membrane comprises oxygen-depleted air exhausted from the supporting membrane; and, discontinuing the oxygen supplied to the biofilm through the supporting membrane for a period of time effective to kill at least some of the worms growing in the biofilm.

2. The method of claim 1 further comprising discontinuing a supply of air to spargers in the tank below the supporting membrane during the period of time.

3. The method of claim 1 further comprising discontinuing a flow of water into the tank during the period of time.

4. The method of claim 1 wherein the period of time is at least 24 hours.

5. The method of claim 1 further comprising a step of adding chlorine to the tank containing the membrane aerated biofilm after the period of time.

6. The method of claim 1 wherein the membrane aerated biofilm is immersed in water and the water is maintained under anoxic or aerobic conditions.

7. The method of claim 6 wherein the membrane aerated biofilm is immersed in water and the water contains suspended growth.

8. The method of claim 1 wherein the period of time is at least 48 hours.

* * * * *